US012682716B2

(12) United States Patent
Sirbu Villa et al.

(10) Patent No.: US 12,682,716 B2
(45) Date of Patent: Jul. 14, 2026

(54) STIR STICK DISPENSER FOR A BEVERAGE VENDING MACHINE AND METHOD FOR DISPENSING STIR STICKS

(71) Applicant: Evoca S.P.A., Valbremo (IT)

(72) Inventors: Dan Alexie Sirbu Villa, Valbrembo (IT); Alberto Crippa, Valbrembo (IT)

(73) Assignee: EVOCA S.P.A., Valbrembo (IT)

( * ) Notice: Subject to any disclaimer, the term of this patent is extended or adjusted under 35 U.S.C. 154(b) by 179 days.

(21) Appl. No.: 18/701,646

(22) PCT Filed: Oct. 20, 2022

(86) PCT No.: PCT/IB2022/060103

§ 371 (c)(1),
(2) Date: Apr. 16, 2024

(87) PCT Pub. No.: WO2023/067548

PCT Pub. Date: Apr. 27, 2023

(65) Prior Publication Data

US 2025/0246040 A1 Jul. 31, 2025

(30) Foreign Application Priority Data

Oct. 21, 2021 (EP) .................................... 21204073
Nov. 11, 2021 (IT) ........................ 102021000028715

(51) Int. Cl.
*G07F 11/24* (2006.01)
*A47F 1/10* (2006.01)
(Continued)

(52) U.S. Cl.
CPC ................ *G07F 11/24* (2013.01); *A47F 1/10* (2013.01); *B65D 83/0418* (2013.01);
(Continued)

(58) Field of Classification Search
CPC .......... G07F 11/16; G07F 11/20; G07F 11/22; G07F 11/24; G07F 13/10; G07F 13/065;
(Continued)

(56) References Cited

U.S. PATENT DOCUMENTS 3,263,860 A * 8/1966 Haas ......................... A47F 1/10 221/281
5,381,925 A * 1/1995 Cervantes ................. A47F 1/10 221/202
(Continued)

FOREIGN PATENT DOCUMENTS

EP 1107200 A2 6/2001
EP 1586254 A1 10/2005
(Continued)

OTHER PUBLICATIONS

International Preliminary Report on Patentability for International Application No. PCT/IB2022/060103 mailed Oct. 18, 2023.
(Continued)

*Primary Examiner* — Ernesto A Suarez
(74) *Attorney, Agent, or Firm* — Ballard Spahr LLP

(57) ABSTRACT

A stir stick dispenser (30) and a method for dispensing stir sticks (2) in a beverage vending machine (A), whereby a stir stick (2) is extracted from a stack (4) of stir sticks (2) via an extractor (31) reciprocatingly movable between a retracted rest position and an advanced extraction position and is expelled by moving it away from the extractor (31) and exerting, through a rocker lever, an expulsion thrust during the movement of the extractor (31) towards its advanced position.

6 Claims, 8 Drawing Sheets

(51) Int. Cl.
*B65D 83/04* (2006.01)
*B65D 83/08* (2006.01)
*G07F 13/06* (2006.01)
*G07F 13/10* (2006.01)

(52) U.S. Cl.
CPC ....... *B65D 83/0829* (2013.01); *G07F 13/065* (2013.01); *G07F 13/10* (2013.01)

(58) Field of Classification Search
CPC ... A47F 1/10; B65D 83/0418; B65D 83/0829; B65D 83/087
See application file for complete search history.

(56) References Cited

U.S. PATENT DOCUMENTS

| | | | | |
|---|---|---|---|---|
| 9,113,729 B2* | 8/2015 | Righetti | A47F 1/10 | |
| 2012/0012607 A1* | 1/2012 | Kopco | A47F 1/10 | 221/223 |
| 2012/0116576 A1* | 5/2012 | Mosconi | G07F 13/065 | 700/232 |
| 2024/0172879 A1* | 5/2024 | Sirbu Villa | G07F 13/065 | |
| 2024/0242558 A1* | 7/2024 | Sirbu Villa | G07F 11/72 | |

FOREIGN PATENT DOCUMENTS

| | | | | |
|---|---|---|---|---|
| EP | 2345010 A1 | 7/2011 | | |
| EP | 2563187 A1 | 3/2013 | | |
| IT | 20120761 A1 | 3/2014 | | |
| JP | H0887670 A * | 4/1996 | G07F 11/42 | |

OTHER PUBLICATIONS

International Search Report and Written Opinion from International Application No. PCT/IB2022/060103 mailed Feb. 1, 2023.
PCT Direct Letter for International Application No. PCT/IB2022/060103 mailed Nov. 21, 2022.
Reply to Written Opinion for International Application No. PCT/IB2022/060103 filed Aug. 16, 2023.

* cited by examiner

FIG. 7
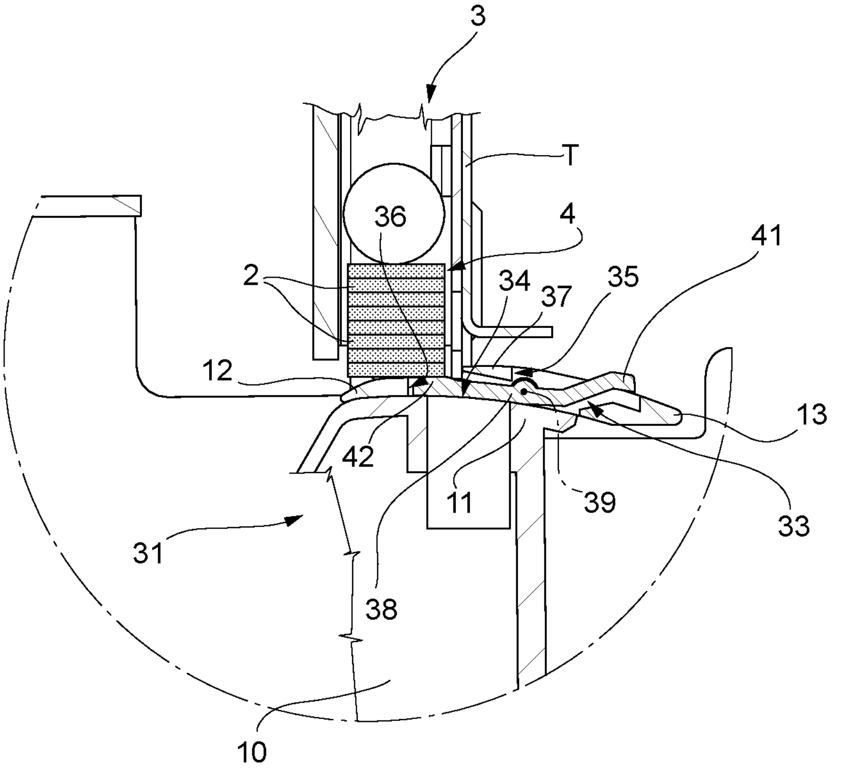
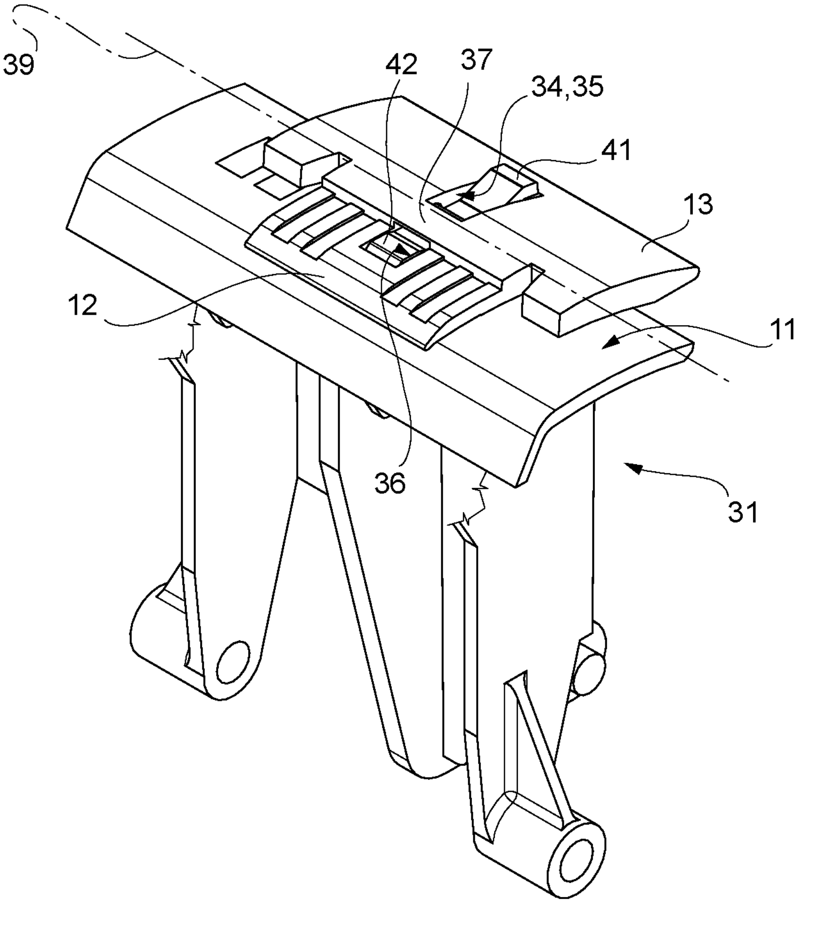
FIG. 9

FIG. 8
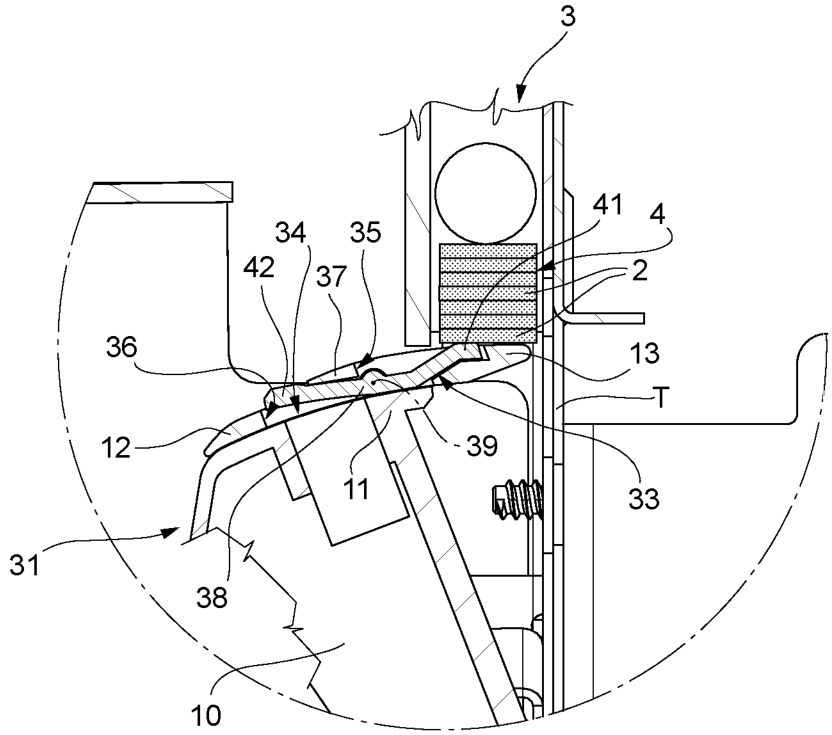
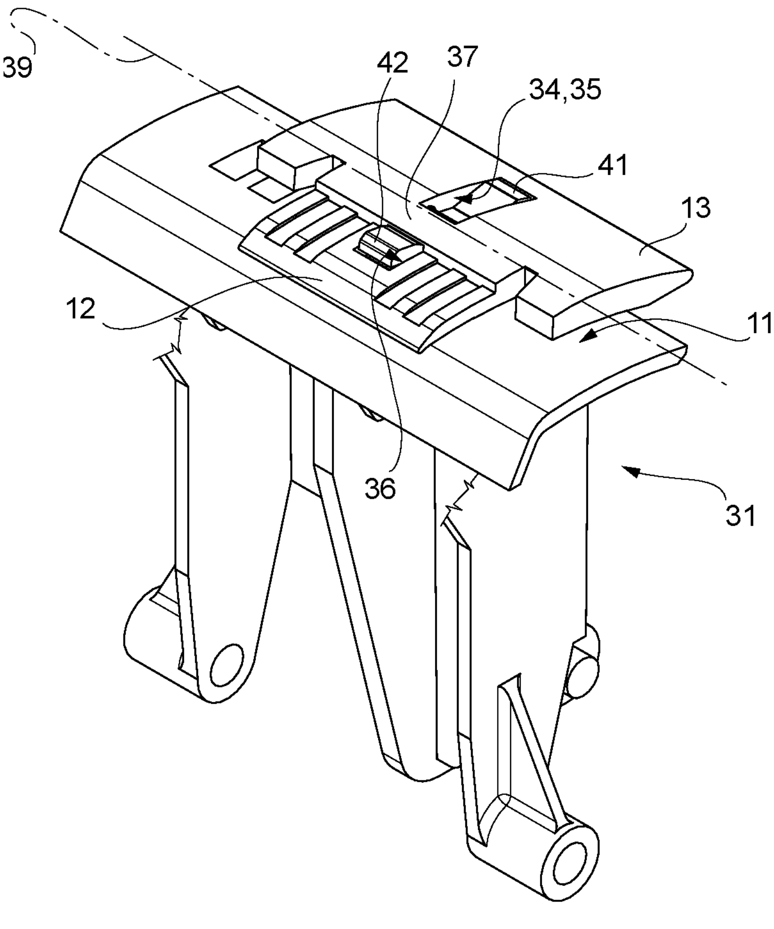
FIG. 10

STIR STICK DISPENSER FOR A BEVERAGE VENDING MACHINE AND METHOD FOR DISPENSING STIR STICKS

CROSS-REFERENCE TO RELATED APPLICATIONS

This patent application is a U.S. national stage of PCT international application No. PCT/IB2022/060103 filed on Oct. 20, 2022, which claims priority to European patent application no. 21204073.7 filed on Oct. 21, 2021, and Italian patent application no. 102021000028715 filed on Nov. 11, 2021, the disclosure of each of which is incorporated herein by reference.

TECHNICAL FIELD OF THE INVENTION

The present invention relates to a stir stick dispenser for a beverage vending machine and a method for dispensing stir sticks.

STATE OF THE ART

In the vending industry, it is known to have a stir stick dispenser inside the beverage vending machines and which is controlled by an electronic control unit of the beverage vending machine to dispense stir sticks directly inside the beverage cups.

The stir sticks are normally released in the cups before the cups are filled with the beverage and dispensing may be responsive to users' requests for sugar to be added in the selected beverages.

In general, a known stir stick dispenser comprises a stir stick magazine containing one or more columns of orderly stacked stir sticks, and an extractor operated, in use, to move reciprocally and transversally with respect to the stir sticks, through a lower outlet of the stir stick magazine to eject, by a back-and-forth movement through the lower outlet, only the stir stick at the bottom of the stack and to let it fall directly in the cup or on a slide driving it to the cup.

Stir stick dispensers of the kind specified above are known, for example, from EP 1 586 254 A1, EP 2 345 010 A1 and EP 2 563 187 A1.

Stir stick dispensers of the kind specified above have been used for decades in a fairly satisfying way in order to dispense plastic stir sticks, but revealed serious drawbacks as long as plastics was outlawed after recent regulations concerning environment protection came into force, and the operators of this field were obliged to adopt alternative "green" solutions, particularly to use stir sticks made of biodegradable or compostable materials such as wood or paper.

The problems connected with the use of wood or paper stir sticks inside conventional dispensers originate from the fact that, in these dispensers, the extractor, the stir stick magazine and the stack of stir sticks are configured to interact with each other with high precision so that the movement of the extractor allows the extraction of a single stick from the bottom of the stack.

As for plastics stir sticks, such a precision is normally assured over time by the fact that the shape and size of the stir sticks stacked in the stir stick magazine remain substantially stable, regardless of the environmental conditions inside the automatic dispenser.

On the contrary, the same precision cannot be assured in case of stir sticks made of other materials than plastics, particularly wood and paper, since, as known, these materials suffer a lot from temperature and humidity changes, and it can occur that the stir sticks warp to such an extent that the action of the extractor becomes ineffective, thus causing the stir stick dispenser to jam.

The problem of the deformation of the stir sticks is, at least in part, solved by the dispenser described in the Italian patent application No 102021000007343 filed by the current Applicant and in which a back-and-forth movable extractor extracts individual stir sticks time regardless of whether they are deformed or not.

In known stir stick dispensers, in some cases, although extraction was successful, the stir stick dispenser still got jammed or in any case malfunctioned.

Experimentally, it was found that the above problem was mainly due to the fact that the stir sticks, once removed from the stack, continued towards the inlet of the duct in the desired way, whereas, in other cases and completely unpredictably, it continued, remaining however partially coupled to the extractor, which often brought the stir sticks back and then released them at any point and generally in a position other than that envisaged for the correct entry into the fall duct.

OBJECT AND SUMMARY OF THE INVENTION

It is an object of the present invention to provide a stir stick dispenser for a beverage vending machine, which allows the above problem to be solved.

According to the present invention, a stir sticks dispenser for a beverage vending machine is disclosed.

The present invention also relates to a method for dispensing stir stick.

According to the present invention, a method for dispensing stir sticks is disclosed.

BRIEF DESCRIPTION OF THE DRAWINGS

The present invention will now be described with reference to the accompanying drawings, which show a non-limiting embodiment thereof, wherein:

FIGS. 7 and 8 show, partially in section and on an enlarged scale, a detail of the stir stick dispenser shown in FIG. 6 arranged in two different operating conditions; and FIGS. 9 and 10 show, in perspective view, a detail of FIG. 6 arranged in two different operating positions.

DETAILED DESCRIPTION OF PREFERRED EMBODIMENTS OF THE INVENTION

The present invention will now be described in detail with reference to the accompanying drawings in order to allow a skilled person to implement it and use it. Various modifications to the described embodiments will be readily apparent to those skilled in the art and the general principles described may be applied to other embodiments and applications without however departing from the protective scope of the present invention as defined in the appended claims. Therefore, the present invention should not be regarded as limited to the embodiments described and illustrated herein, but should be allowed the broadest protection scope consistent with the features described and claimed herein.

Unless otherwise defined, all technical and scientific terms used herein have the same meaning commonly understood by one of ordinary skill in the art to which the invention belongs. In case of conflict, the present specification, including the definitions provided, will control. Furthermore, the examples are provided for illustrative purposes only and as such should not be considered limiting.

In order to facilitate the understanding of the embodiments described herein, reference will be made to some specific embodiments and a specific language will be used to describe the same. The terminology used herein is used for the purpose of describing particular embodiments only, and is not intended to limit the scope of the present invention.

Figure 1:
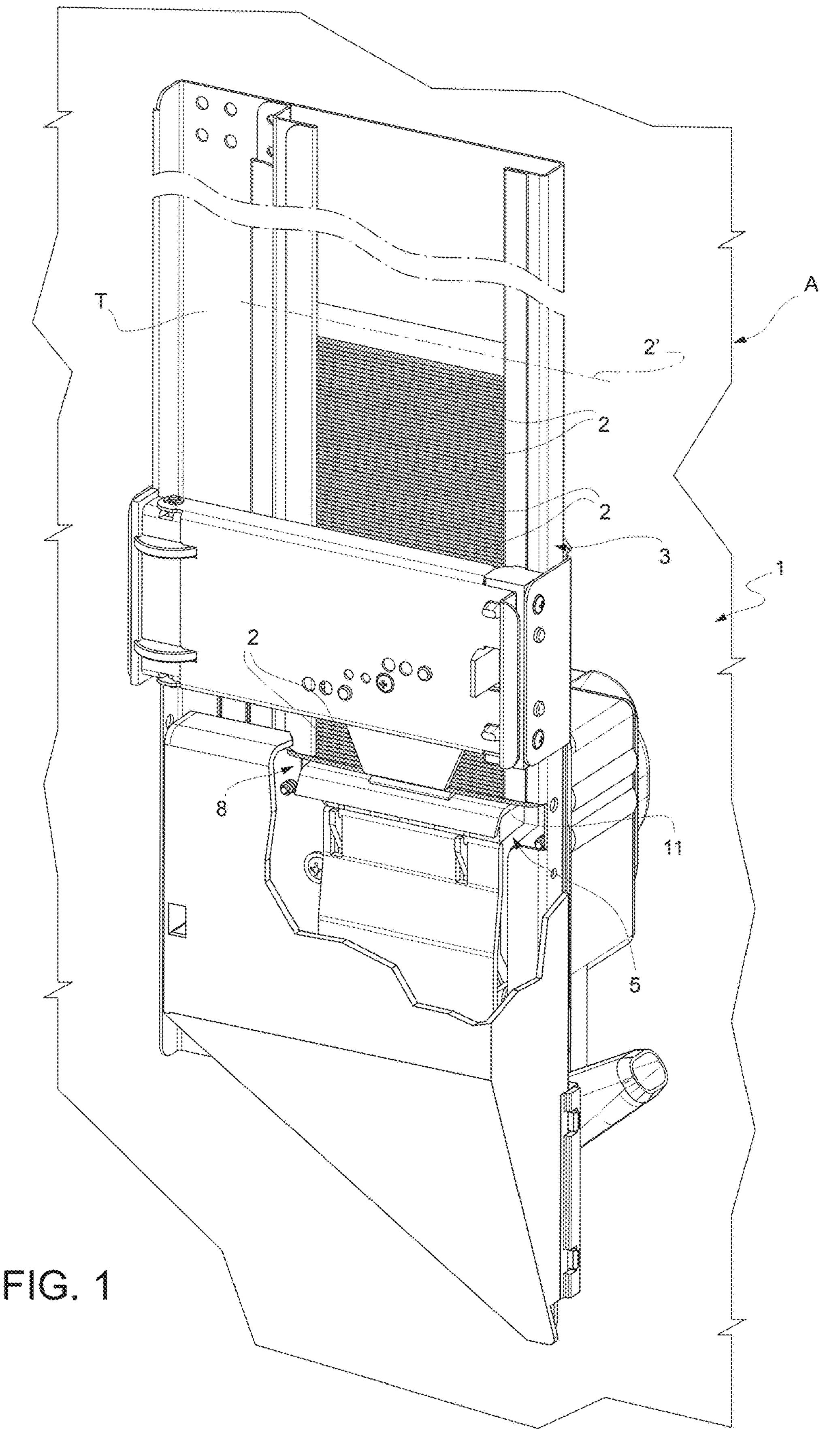
FIG. 1 schematically and partially shows a beverage vending machine with a stir stick dispenser according to a preferred embodiment of the invention.
Figure 2:
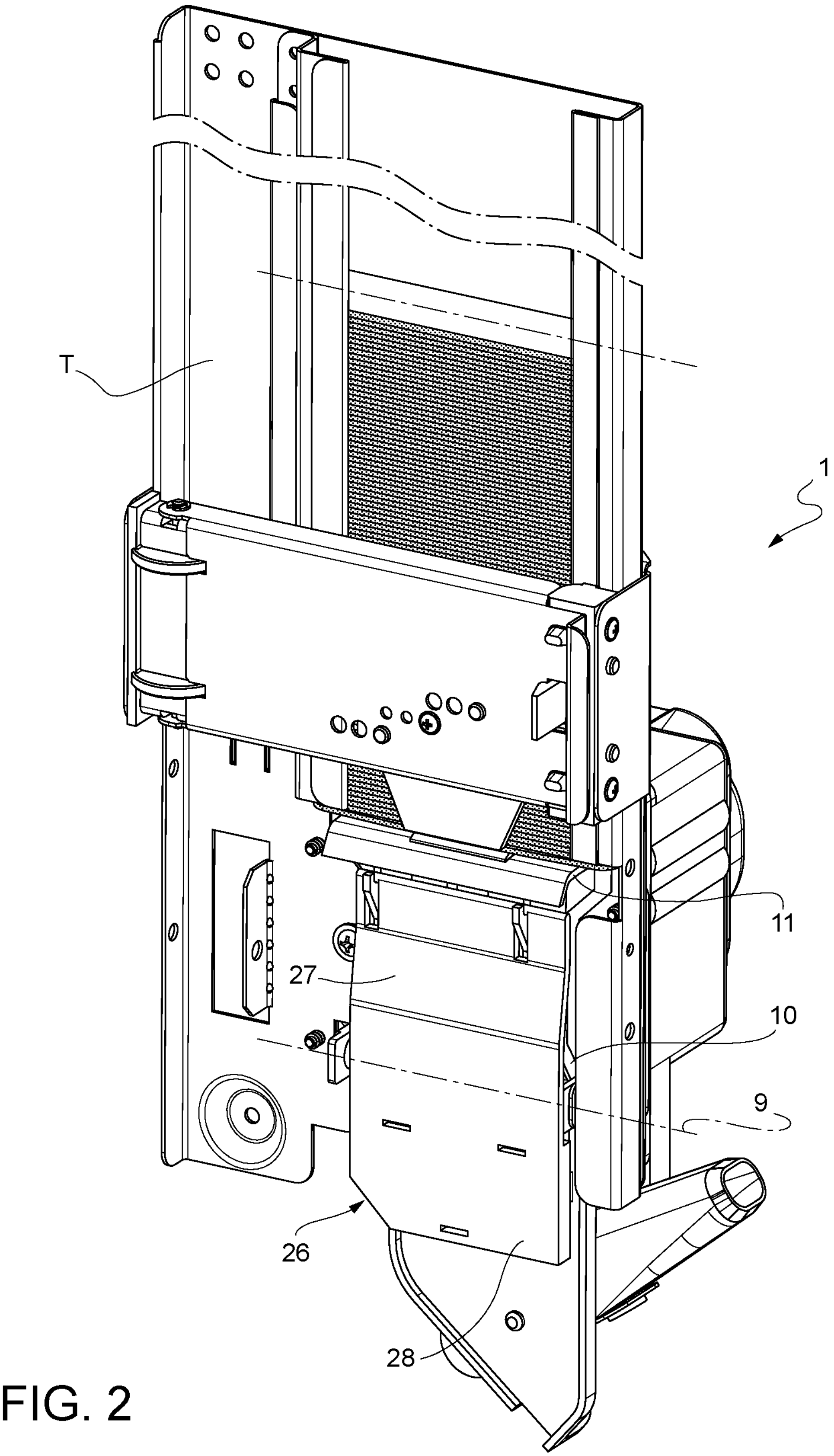
FIGS. 2 and 3 show a side elevation and perspective view, with parts removed for clarity, of the stir stick dispenser shown in FIG. 1 and arranged in two different operating conditions.
Figure 3:
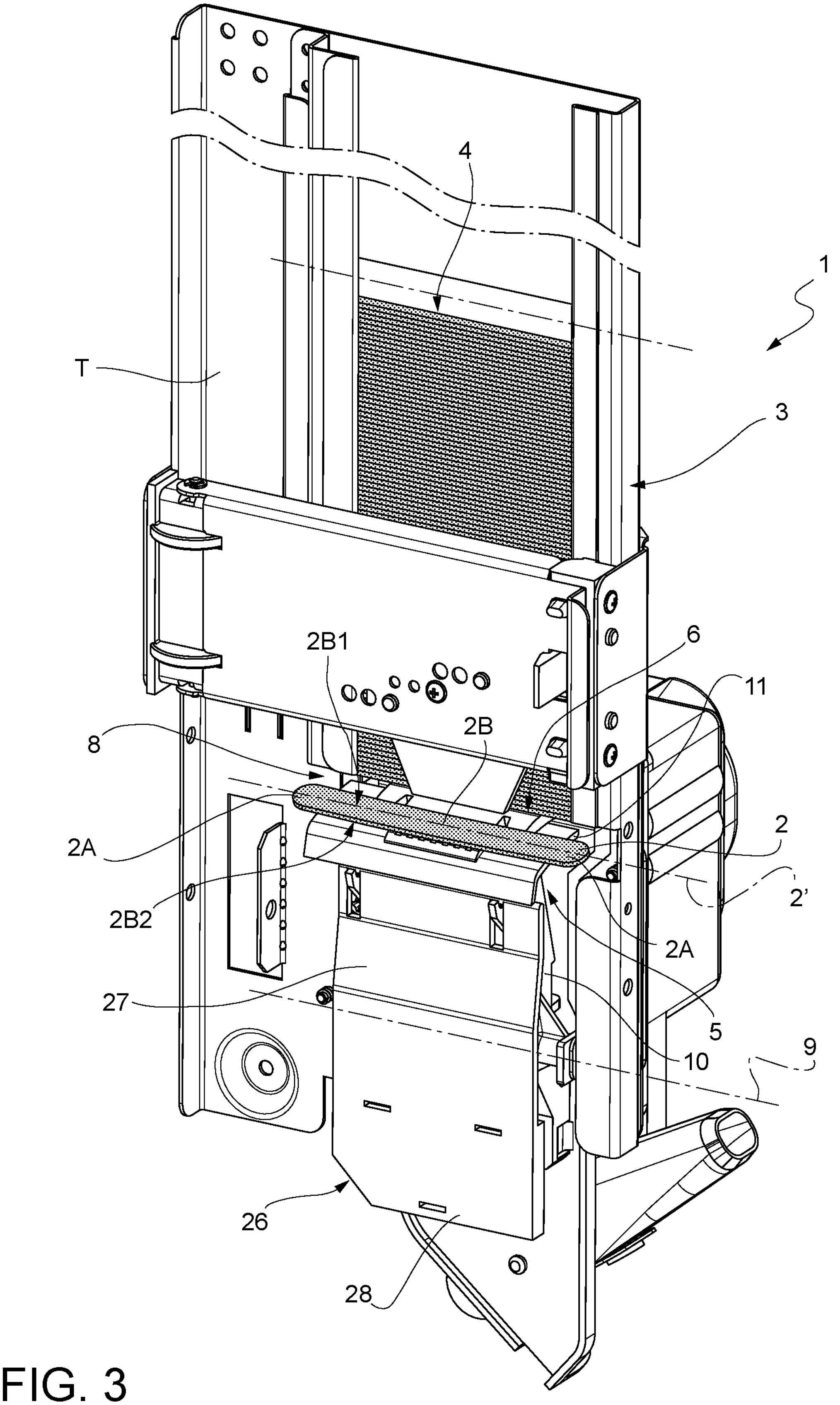

In FIG. 1, A references, as a whole, a beverage vending machine partially shown.

The beverage vending machine A comprises a stich stick dispenser 1 to automatically dispense individual stir sticks 2, one at a time, into a cup B arranged to receive a beverage to be mixed.

As shown in the attached Figures, the above-described stir sticks 2 are shaped as elongated flat elements, each of which has a longitudinal axis 2' and comprises two rounded end portions 2A and an intermediate portion 2B delimited by two major flat faces 2B1 and two straight narrow sides 2B2. Although this is the shape most commonly used for stir sticks 2, which in this shape are usually also referred to as mixing paddles, however the stir stick dispenser of the present invention is configured to also dispense stir sticks of a different size or shape from the stir sticks of the example shown. For example, the stir sticks may not be flattened or only partially flattened and/or have a cross-section that is circular or similar.

The stir stick dispenser 1 comprises a fixed attachment frame T and a stir stick magazine 3 designed to house a stack 4 of stirrers 2 orderly stacked on top of each other and loaded with a weight (not shown).

The stir stick dispenser 1 further comprises an extractor 5 arranged below the magazine 3 and having at the top a support surface 6 which, when the extractor 5 is in a rest position, supports the stack 4 of stirrers 2 in the stir stick magazine 3.

The extractor 5 further comprises a thrust element 7, which is mounted to move back and forth, with respect to the magazine 3, so as to laterally engage the stir stick 2 resting on the support surface 6 to push it transversely through an outlet 8 of the magazine 3 until it is completely extracted from the stack 4 and free to fall downwards.

In the preferred embodiment shown in the accompanying figures, the support surface 6 and the pusher 7 are integral and are both formed on the extractor 5 that is, in this case, is in the form of a swivelling member hinged to the attachment frame T to reciprocatingly pivot about a fixed axis 9 parallel to the longitudinal axis 2' of the stir sticks 2 in the stir stick magazine 3.

In particular, the extractor 5 comprises an arm 10 having a lower end portion hinged to the attachment frame T to rotate around the fixed hinge axis 9 and an upper head portion 11 connected to an upper end portion of the arm 10.

Figure 4:
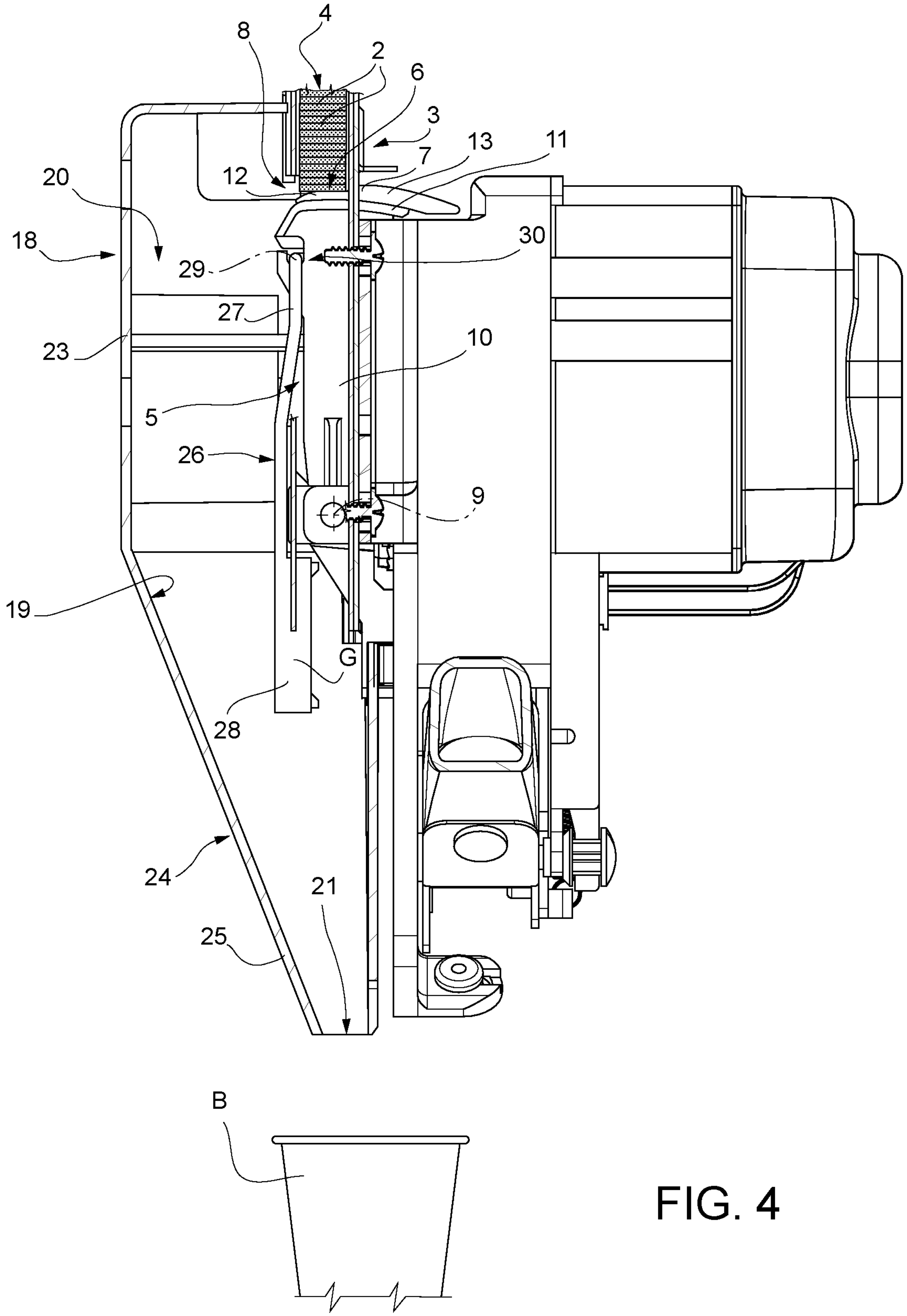
FIGS. 4 and 5 show, in section and on an enlarged scale, a detail of FIG. 1 arranged in two different operating positions.
Figure 5:
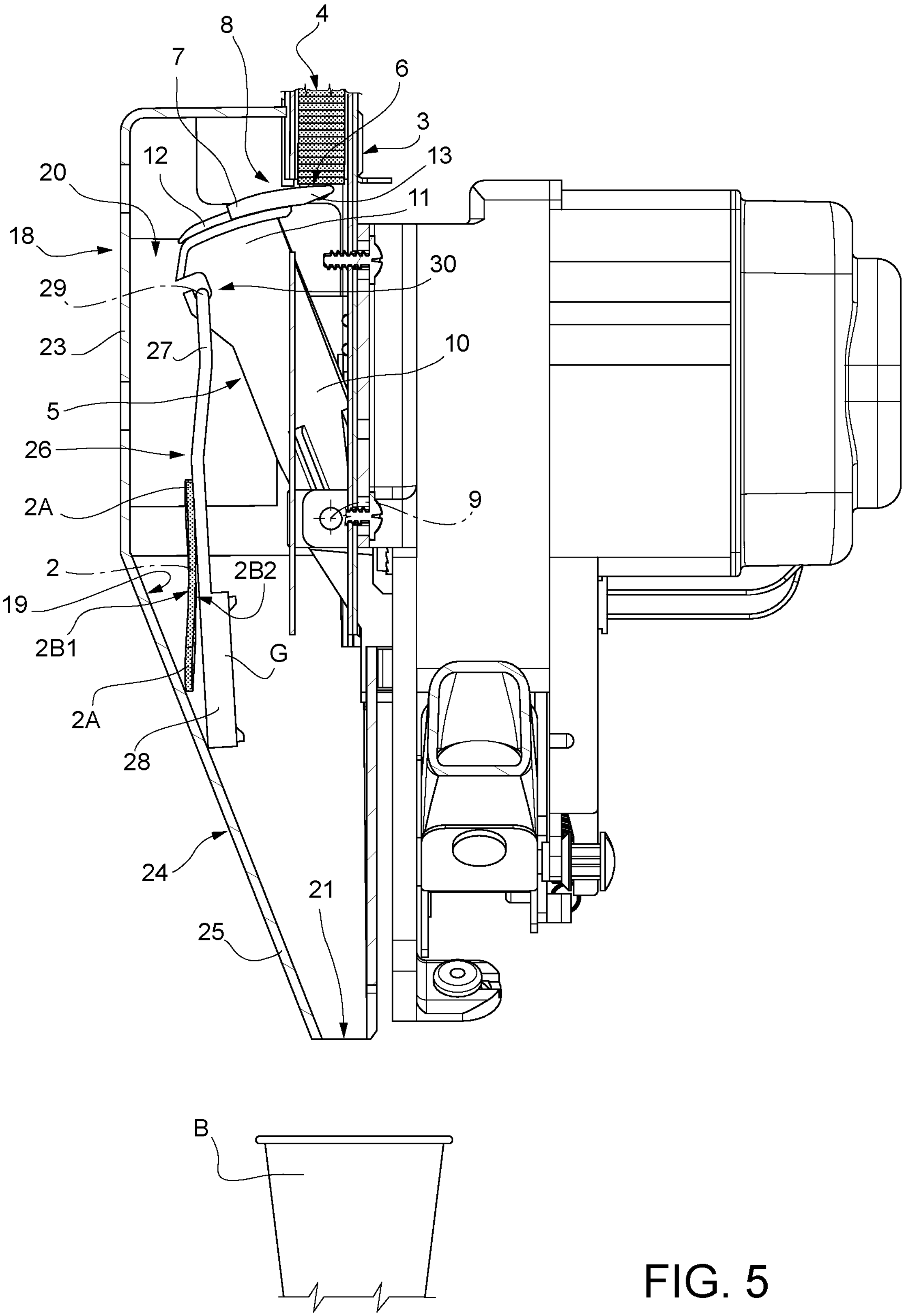

In particular, as shown in FIGS. 4 and 5, the head portion 11 comprises a lowered or support portion 12, an upper surface of which is the aforementioned support surface 6, and a raised portion 13, which is arranged, when the extractor 5 is in the rest position, on the side of the stir stick magazine 3 opposite the outlet 8.

The lowered portion 12 and the raised portion 13 are mutually connected by a step, which extends parallel to the axis 9 and the longitudinal axis 2' of the stir sticks 2 and has a height less than, or at most equal to, the thickness of a stir stick 2.

The step between the lowered portion 12 and the raised portion 13 defines the above-mentioned pusher 7 to eject the stir stick 2 at the bottom of the stack 4 in response to the oscillation of the swivelling member about the axis 9.

For this purpose, the swivelling member 5 is operated by an electric actuator (not shown) preferably connected via an oscillating cam transmission (not shown) and electronically controlled by an electronic control unit of the beverage vending machine A to move the swivelling member 5 between the retracted rest position (FIG. 4), in which the stir sticks 2 rest on the support surface 6, and the step, i.e., the pusher 7, is facing the stir stick 2 at the bottom of the stack 4, and an advanced extraction position (FIG. 5), in which the swivelling member 5 is rotated forwards, i.e., counter-clockwise in FIGS. 4 and 5, to such an extent that the pusher 7 is arranged beyond the outlet 8 of the stir stick magazine 3.

While moving between the retracted rest position and the advanced extraction position, the pusher 7 engages a side of the stirrer 2 resting on the support surface 6 and pushes it in an extraction direction orthogonal to the hinge axis 9 and transversal to the longitudinal axis 2' through the outlet 8 of the stir stick magazine 3 until it is ejected from the stack 4. When the advanced extraction position is reached, the swivelling member 5 returns to the rest position, preferably under the thrust of a spring.

During extraction of a stir stick 2, the stack 4 is held up by the raised portion 13 of the extractor 5 and returns to rest on the lowered portion 12 when the swivelling member returns to the rest position.

In the above-described embodiment, the extractor 5 hence comprises a lowered portion 12 and a raised portion 13 which move integrally as parts of a swivelling member.

In an alternative embodiment (not shown), when the extractor 5 is in the rest position, the stack 4 rests on the upper surface of the raised portion 13 instead of the lowered portion 12, and the extractor 5 is controlled to eject a stir stick 2 at the bottom of the stack 4 during the return stroke instead of during the forward stroke of the extractor 5. Also in this embodiment, the lowered portion 12 can be integral to the raised portion 13, thus movable with it, or stationary.

Irrespective of the configuration of the extractor 5, the support surface 6 is so sized as to engage only a central portion of the stir stick 2 at the bottom of the stack 4, i.e., the width of the support surface 6, as measured in a direction parallel to the longitudinal axis 2' of the stir sticks 2, is such that the stir stick 2 at the bottom of the stack 4 is in contact with the support surface 6 only at a central portion 2B the stir stick 2 and not along the entire length thereof.

With reference to FIGS. 4 and 5, the stir stick dispenser 1 further comprises a front, shaped casing 18, which surrounds the extractor 5 and defines a drop chute 19 to guide the extracted stir stick 2 into the cup B.

The drop chute 19 has an inlet 20 adjacent to the head portion 11 of the extractor 5 and is configured to receive one stir stick 2 at a time from the extractor 5, and an outlet 21 arranged below the inlet 20 and near an upper end of the cup B and configured to supply the stir stick 2 into the same cup B.

In particular, the shaped casing 18 comprises a substantially vertical, constant cross-section upper section 23 delimiting the inlet 20, and a downwards-tapered lower section 24 delimiting the outlet 21 and having a front wall 25 inclined downwards and towards the attachment frame T and forming a guide chute to guide the stir stick 2 towards the outlet 21.

With reference to FIGS. 4 and 5, the stir stick dispenser 1 further comprises a movable member 26 operable to temporarily stop each stir stick 2 during its drop towards the outlet 21.

The movable member 26 is arranged within the drop chute 19 astride the sections 23 and 24 and hangs to the head portion 11 of the extractor 5 like a pendulum or swing.

The movable member 26 is formed by a shaped plate body and comprises an upper plate 27, whose upper end is hinged to the head portion 11 to rotate about a horizontal hinge axis 29 stationary with respect to the head portion 11, and a lower end stably connected to a stop block 28.

The position of the hinge axis 29 on the head portion 11 is chosen so that when the swivelling member is in the retracted position, the distance of the hinge axis 29 from the attachment frame T, as measured in a horizontal direction, is greater than the distance of the hinge axis 9 from the attachment frame T, as measured in the same direction.

The stop block 28 is conveniently formed by a plate body, which has a thickness greater than that of the upper plate 27 and is arranged facing the wall 25 that defines the guide chute.

Conveniently, a front part of the head portion 11 forms a hook 30 and the upper plate 27 has two intermediate fulcrum pins inserted in the hook 30 through a front passage. In this way, the movable member 26 is free to freely oscillate back and forth about the hinge axis 29. This allows the movable member 26 to rotate autonomously, i.e., only under the sole effect of its weight, only during the movement of the swivelling member 5.

In particular, the inclination of the guide chute, the vertical dimension of the movable member 26 and its centre of gravity G are chosen in such a way that, when the extractor 5 is in the advanced extraction position, the movable member 26 is in an advanced operating position such that the stop block 28 is arranged in abutment against the guide chute to temporarily stop the stir stick 2 in the drop chute 19, and when the extractor 5 is in the retracted position or in a position close thereto, the movable member 26 is in an inoperative or rest position, in which it allows the stir stick 2 to move inside the drop chute 19 towards the outlet 21.

From the foregoing it may be appreciated that the provision of the movable member 26 and its autonomous and automatic positioning by the sole effect of the weight allow the free drop of the stir stick 2 of the known solutions to be simply and safely transformed into a controlled drop. In other words, the provision of the movable member 26 allows the drop speed of the stir stick 2 to be annulled at a predefined point of the drop path, which can be chosen by simply sizing the geometric characteristics of the movable member 26 and of the guide chute, and the intensity of the impact of the stir stick inside the cup B to be controlled.

Furthermore, the movable member 26 defines a further rest plane or an abutment and control element of the position of the stir stick 2. Such further rest plane defines, in particular, a further guide of the stir stick 2 which cooperates with the inclined plane defining during its movement towards its rest position an intermediate variable-section passage which inevitably precisely guides the stir stick 2 towards the outlet 21 and in a desired inlet direction in the cup B.

Figure 6:
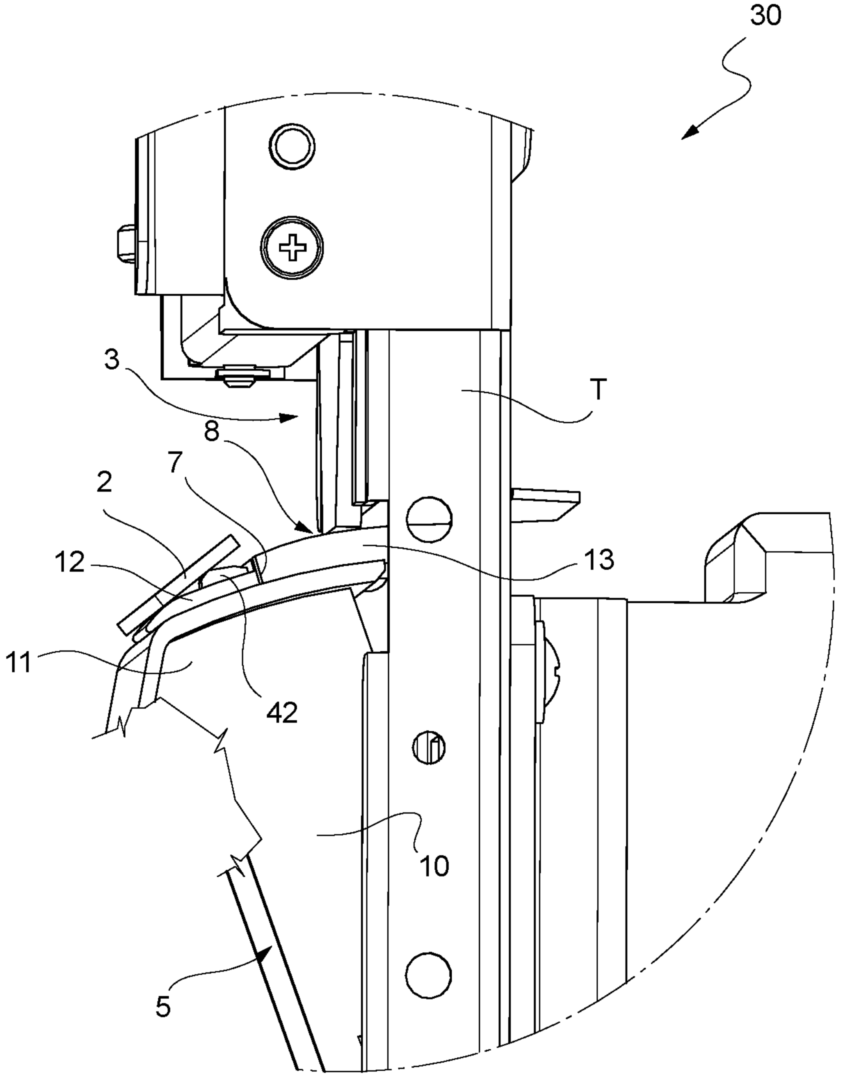
FIG. 6 shows a variant of the stir stick dispenser according to the invention.

The variant shown in FIG. 6 relates to a stir stick dispenser 30, which differs from the dispenser 1 in FIGS. 1 to 5 in certain construction details and whose constituent parts are identified, where possible, with the same reference numbers that identify corresponding parts of the dispenser 1.

The dispenser 30 comprises an extractor 31, which differs from the extractor 5 in that the head portion 11, in addition to the lowered portion 12 and the raised portion 13, includes an expulsion lever 33 to move the extracted stirrer 2 away from the head portion 11 and push it towards the inlet 20 of the fall duct 19.

The expulsion lever 33 is arranged in a partial housing seat 34 obtained in the head portion 11 between the lowered portion 12 and the raised portion 13.

The seat 34 communicates with the outside towards the top and through two openings 35 and 36 separated from each other by a wall 37 integral with the raised portion 13.

The expulsion lever 33 has an intermediate portion 38 arranged below the wall 37 and hinged to the head portion 11 to oscillate around a fixed hinge axis 39 parallel to the axis 9 and the longitudinal axis 2'.

The expulsion lever 33 then comprises two opposing end portions indicated by 41 and 42, which are shaped so that when one is raised and external to the head portion 11 the other is lowered and inserted in the seat 34, and vice versa, as shown in FIGS. 7 to 10.

In use, when the extractor 31 is arranged in its retracted position, as shown in FIG. 7, the hinge axis 39 is arranged behind the magazine 4, i.e., on the other side of the outlet 8 of the magazine 4, and the portion 42 is held in its lowered position by the stir sticks 2 resting on the lowered portion 12, and consequently, the portion 41 protrudes upwards through the opening 35 and beyond the support surface of the raised portion 13, as again shown in FIG. 7.

On the other hand, when the extractor 32 is arranged in its advanced position, as shown in FIG. 8, the hinge axis 39 is arranged in front of the magazine 4, and the portion 41 is held down by the stack 4 of stir sticks 2 inside the seat 34, and the portion 42 is in a raised position and protrudes upwards through the opening 36 and beyond the support surface 6 of the lowered portion 12, as again shown in FIG. 8.

The variant shown in FIG. 6 relates to a stir spatula dispenser 30, which differs from the stir stick dispenser 1 shown in FIGS. 1 to 5 for some construction details and whose constituent parts are indicated, where possible, by the same reference numerals as the corresponding parts of the stir stick dispenser 1.

The stir spatula dispenser 30 comprises an extractor 31, which differs from the extractor 5 in that the head portion 11 comprises, in addition to the lowered portion 12 and the raised portion 13, a rocker expulsion lever 33 to move away the stir spatula 2 extracted from the head portion 11 and push it towards the inlet 20 of the drop chute 19.

The expulsion lever 33 is arranged within a partial housing seat 34 formed in the head portion 11 between the lowered portion 12 and the raised portion 13.

The seat 34 communicates with the outside upwards and through two openings 35 and 36 mutually separated by a wall 37 integral with the raised portion 13.

The expulsion lever 33 has an intermediate portion 38 arranged below the wall 37 and hinged to the head portion 11 to oscillate about a fixed hinge axis 39 parallel to the axis 9 and to the longitudinal axis 2'.

The expulsion lever 33 further comprises two opposite end portions 41 and 42, which are shaped so that when one is raised and external to the head portion 11 the other is lowered and inserted into the seat 34 and vice versa, as shown in FIGS. 7 to 10.

During operation, when the extractor 31 is in the retracted position shown in FIG. 7, the hinge axis 39 is arranged behind the stir stick magazine 4, i.e., on the other side of the outlet 8 of the stir stick magazine 4 and the portion 42 is kept in a lowered position by the stir spatulas 2 resting on the lowered portion 12 and, consequently, the portion 41 protrudes upwards through the opening 35 and beyond the rest plane of the raised portion 13, as shown in FIG. 7.

When the extractor 32 is in the advanced position shown in FIG. 8, the hinge axis 39 is arranged in front of the stir stick magazine 4 and the portion 41 is kept lowered by the stack 4 of stir spatulas 2 in the seat 34, and the portion 42 is raised and protrudes upwards through the opening 36 and beyond the rest plane of the lowered portion 12, as shown in FIG. 8.

As shown in FIGS. 6 and 8, the protrusion of the portion 42 through the opening 36 causes a thrust from the bottom upwards acting on the lower surface of the extracted stir spatula 2, causing the lifting of the rear part of the stir spatula 2 extracted from the stack 4, the spacing apart of the stir spatula 2 from the lowered portion 12 and from the step between the portions 12 and 13 and the consequent pushing of the stir spatula 2 inside the drop chute 19.

The provision of the expulsion lever 33 always ensures the detachment of the stir spatula 2 extracted from the stack 4 whatever the geometric characteristics of the stir spatula 2 are and regardless of the material with which the stir spatula 2 is made.

From the foregoing it may be appreciated that in the stir stick dispenser 1 the geometry and the size of the movable member 26 as well as the relative position of the hinge axes 9 and 29 can be different from those exemplarily described, with the purpose of varying or modifying the height of the interception point of the stir stick 2 along the drop chute 19 so as to vary the advancing motion profile thereof.

In the stir spatula dispenser 30, the geometry of the expulsion lever 33 could be different and the extractor 31 could be devoid of the movable member 26 or be provided or associated with a stop device different from the one indicated for the stir stick dispenser 1.

In particular, in an embodiment, not shown, the expulsion lever 33 could be shaped so that, when the extractor 31 is in the advanced position, the pivoting around the hinge axis 29 of the expulsion lever 33, which causes the lifting of the portion 42, is not a consequence of the lowering of the portion 41 under the thrust of the stack 4 of stir sticks 2 but is caused by the action of a spring arranged below the portion 42.

Therefore, in this embodiment, the shape and size of the portion 41 are not crucial for the movement of the portion 42, or the portion 41 may be missing altogether. In this case, the expulsion lever 33 comprises only the portion 42 which, in turn, may be hinged to oscillate about the hinge axis 29 or may be mounted in the relevant seat 36 to move elastically in a direction perpendicular to the support surface 6 between a normal raised position, which is assumed when the extractor 31 is in the advanced position, and a lowered position, inside the seat 36, which is assumed when the extractor 31 is in the retracted position, and the portion 42 is weighted by the weight of the stack 4 of stir sticks 2.

The invention claimed is:

1. A stir stick dispenser for a beverage vending machine, the stir stick dispenser comprising:

a fixed frame;

a stir stick magazine carried by the fixed frame and configured to house a stack of stir sticks;

an extractor arranged below the stir stick magazine to individually extract the stir sticks from the stack and having at the top a support surface which, when the extractor is in a rest position, supports the stack of stir sticks in the stir stick magazine;

wherein the extractor is coupled to the fixed frame and is motorised to move in an extraction direction transversal to a longitudinal axis of the stir sticks between a retracted rest position, in which the stack rests on the support surface, and an advanced extraction position, in which the stir stick at the bottom of the stack is extracted; and an expulsion member carried by the extractor to expel the extracted stir stick and movable with respect to the extractor to move the stir stick away from the extractor; wherein the expulsion member comprises a thrust portion and is mounted to the extractor to move, as a result of the extractor moving between the retracted and advanced positions, between a lowered position, which is assumed when the extractor is in the retracted position and the thrust portion does not protrude beyond the support surface, and a raised position, which is assumed when the extractor is in the advanced position and the thrust portion protrudes beyond the support surface, in order to detach and move the extracted stirrer away from the support surface; and wherein the expulsion member is configured so that, when the extractor is in the retracted position, the thrust portion of the expulsion member is held in the lowered position by the weight of the stack of stir sticks.

2. The stir stick dispenser of claim 1, wherein the expulsion member comprises a rocker lever with an intermediate portion hinged to the extractor so as to freely rotate in opposite directions about a hinge axis fixed with respect to said extractor; the rocker lever further comprises two opposite end portions arranged on opposite sides of the hinge axis and configured to cooperate, in use, one with the stir stick at the bottom of the stack and the otherwith the stir stick extracted from the stack of stir sticks; wherein one of the end portions defines said thrust portion, and the other end portion defines an actuation portion to actuate the thrust portion.

3. The stir stick dispenser of claim 2, wherein the hinge axis is a horizontal axis.

4. The stir stick dispenser of claim 2, wherein the extractor is hinged to the frame to reciprocatingly oscillate about a further hinge axis fixed with respect to the frame and parallel to the hinge axis; in the extraction direction, the hinge axis is arranged behind the stir stick magazine when the extractor is in the retracted position and in front of the stir stick magazine when the extractor is in the advanced position.

5. The stir stick dispenser of claim 2, wherein the extractor is delimited at the top by the support surface for the stir sticks and the rocker lever is movable about the hinge axis between two extreme end-stroke angular positions, in each of which one of the end portions extends over the support surface for the stir sticks, and the other extends tangent to, or below, the support surface.

6. The stir stick dispenser of claim 2, wherein the extractor comprises an upper end portion delimited at the top by the support surface for the stir sticks, and a housing seat formed in the upper end portion; the rocker lever is at least partially housed in the seat; the seat communicates with the outside via a pair of through openings formed through the support surface and each crossed through by a respective the end portion of the rocker lever.

* * * * *